US005216306A

United States Patent [19]

Nakazawa et al.

[11] Patent Number: 5,216,306

[45] Date of Patent: Jun. 1, 1993

[54] CASING STRUCTURE FOR MOTOR

[75] Inventors: Yasuaki Nakazawa, Isesaki; Masashi Fukui, Ashikaga; Hirohiko Maekawa, Yabuzukahon; Takayoshi Sakamoto, Tatehayashi, all of Japan

[73] Assignee: Mitsuba Electric Manufacturing Co., Ltd., Kiryu, Japan

[21] Appl. No.: 881,877

[22] Filed: May 12, 1992

[30] Foreign Application Priority Data

May 24, 1991 [JP] Japan .................................. 3-149693

[51] Int. Cl.[5] .............................................. H02K 5/00

[52] U.S. Cl. ....................................... 310/89; 310/154

[58] Field of Search .................. 310/89, 154, 238, 259

[56] References Cited

U.S. PATENT DOCUMENTS 4,636,107 1/1987 Casler et al. .................... 310/154 X
4,700,093 10/1987 Negishi .
4,795,932 1/1989 Long ................................ 310/89 X
4,851,727 7/1989 Tanaka ............................... 310/154
5,047,679 9/1991 Baader et al. ......................... 310/89

FOREIGN PATENT DOCUMENTS 0176839 9/1986 European Pat. Off. .
1477233 4/1966 France ............................... 310/154
1493845 11/1977 United Kingdom .

*Primary Examiner*—Steven L. Stephan
*Assistant Examiner*—Ed To
*Attorney, Agent, or Firm*—Oliff & Berridge

[57] ABSTRACT

A casing of a motor is rendered light and also capable of forming a magnetic circuit in cooperation with a permanent magnet. The casing consists of an outer cylinder and an end bracket each being made of aluminum. An inner cylinder, made of iron and carrying a permanent magnet fixed to the inner peripheral surface thereof, is integrally fitted on the inner peripheral surface of a cylindrical portion of the outer cylinder which is sealed by the end bracket.

13 Claims, 5 Drawing Sheets 7a
8b
8
12
1
6
3
9
8a
7
5
11
11a
4
2
A 12e
8
6
12
13c
13d
13a
13
13a
6
12e
8b

CASING STRUCTURE FOR MOTOR

BACKGROUND OF THE INVENTION

1. Field of the Invention

The invention relates to a casing structure for a motor which may be used, for example, in electrical equipment of a vehicle.

2. Description of Related Art

Hitherto, a motor of the above-stated kind has had a casing the whole of which is made of iron, a ferromagnetic substance. This is because the casing is required to form a magnetic circuit in cooperation with a permanent magnet fixed to a cylindrical inner peripheral surface thereof. The use of iron, however, results in the motor per se being of a great weight, thereby presenting an obstacle to the achievement of reductions in the weight of motors, such reductions being demanded today. The casing made of iron is also disadvantageous in that it has such a poor heat dissipating ability that the motor may have an excessively high temperature when the motor is used in a high-temperature atmosphere, such as the inside of the engine room of a vehicle, or when the motor generates heat during operation thereof.

In order to reduce the weight of the motor, it is possible to form the casing from aluminum, a substance having a relatively small specific gravity. However, aluminum, which is a non-magnetic substance, accordingly, is not able to form a part of a magnetic circuit and, therefore, cannot be readily adopted.

SUMMARY OF THE INVENTION

The invention has been developed in view of the above-described factors. An object of the present invention is to provide a casing structure for a motor that is capable of eliminating the above drawbacks.

According to the invention, there is provided a casing structure for a motor having a permanent magnet provided on a cylindrical inner peripheral surface of the casing. The casing structure comprises: a casing consisting of a bottomed outer cylinder having a cylindrical portion and an end bracket closing the open end of the outer cylinder, each of the outer cylinder and the bracket being made of a non-magnetic substance; and an inner cylinder integrally fitted on the inner peripheral surface of the cylindrical portion of the outer cylinder and made of a ferromagnetic substance, the inner cylinder carrying a permanent magnet fixed to the inner peripheral surface thereof.

The invention enables, by virtue of the above construction, a magnetic circuit to be formed in a casing while permitting a reduction in the weight of the motor.

BRIEF DESCRIPTION OF THE DRAWINGS

The invention will be described with reference to the drawings in which.

DESCRIPTION OF THE PREFERRED EMBODIMENT

Figure 1:
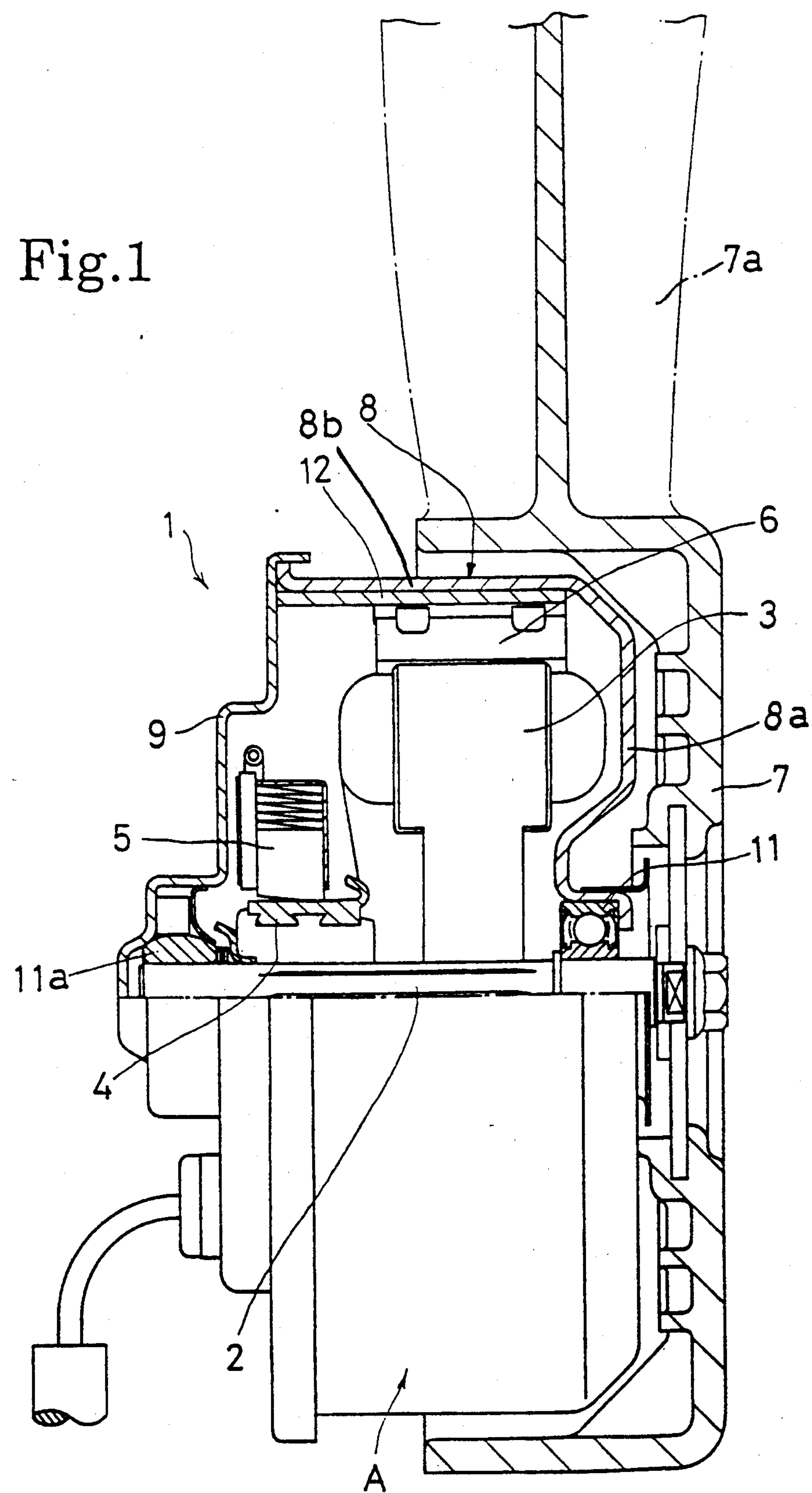
FIG. 1 is a sectional view of a motor.
Figure 2:
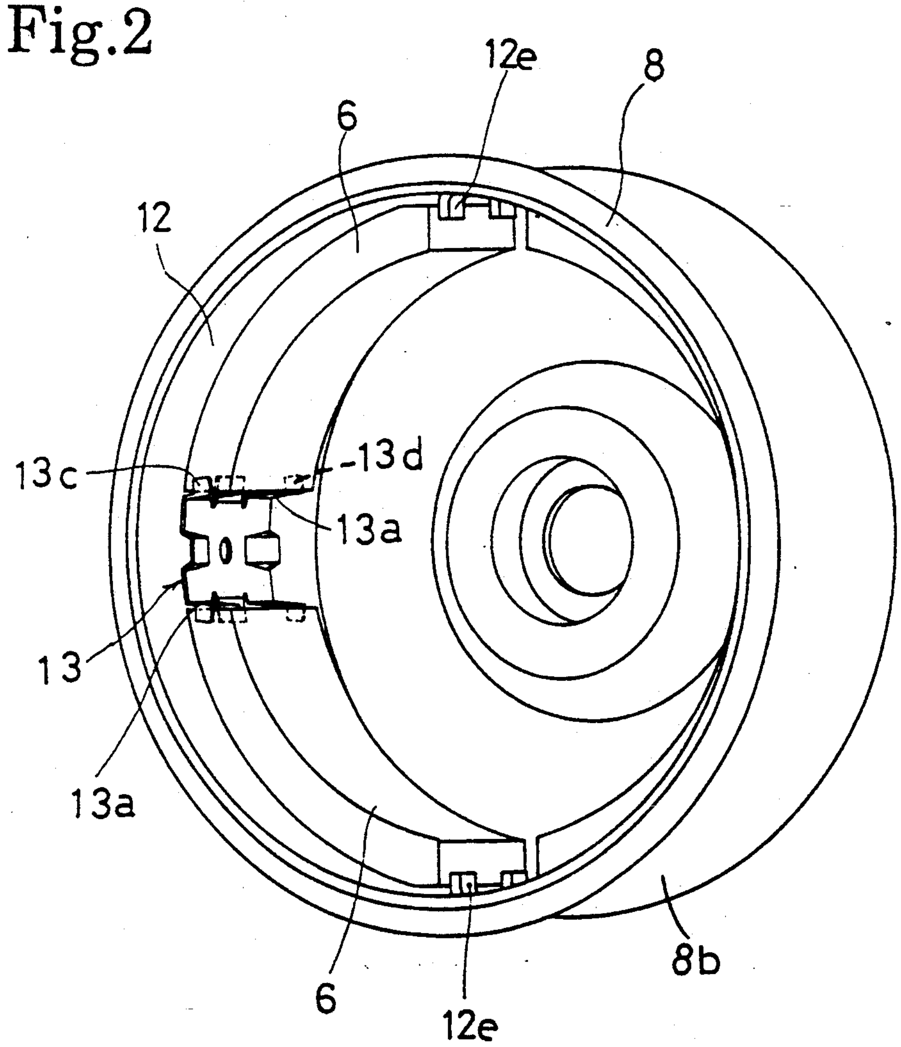
FIG. 2 is a perspective view of an assembly obtained by assembling an inner cylinder and a permanent magnet onto an outer cylinder.
Figure 3:
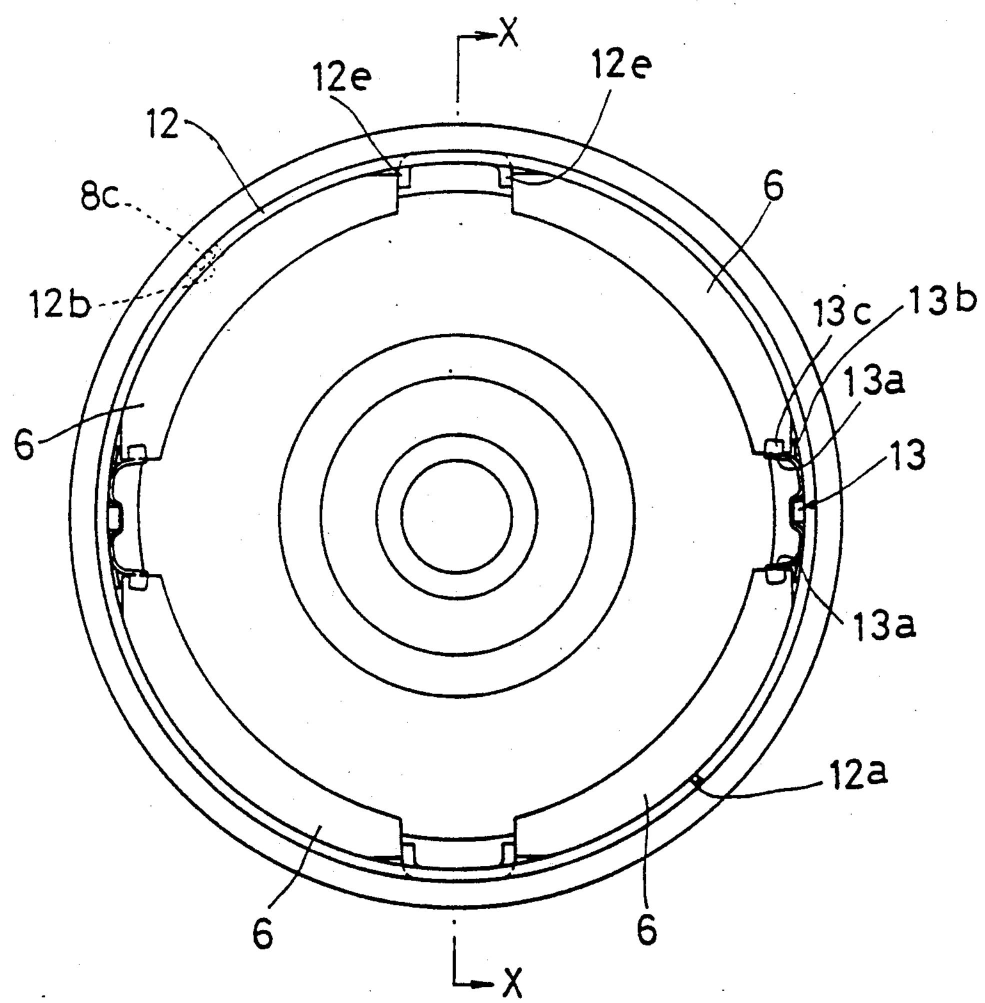
FIG. 3 is a front view of the assembly shown in FIG. 2.
Figure 4:
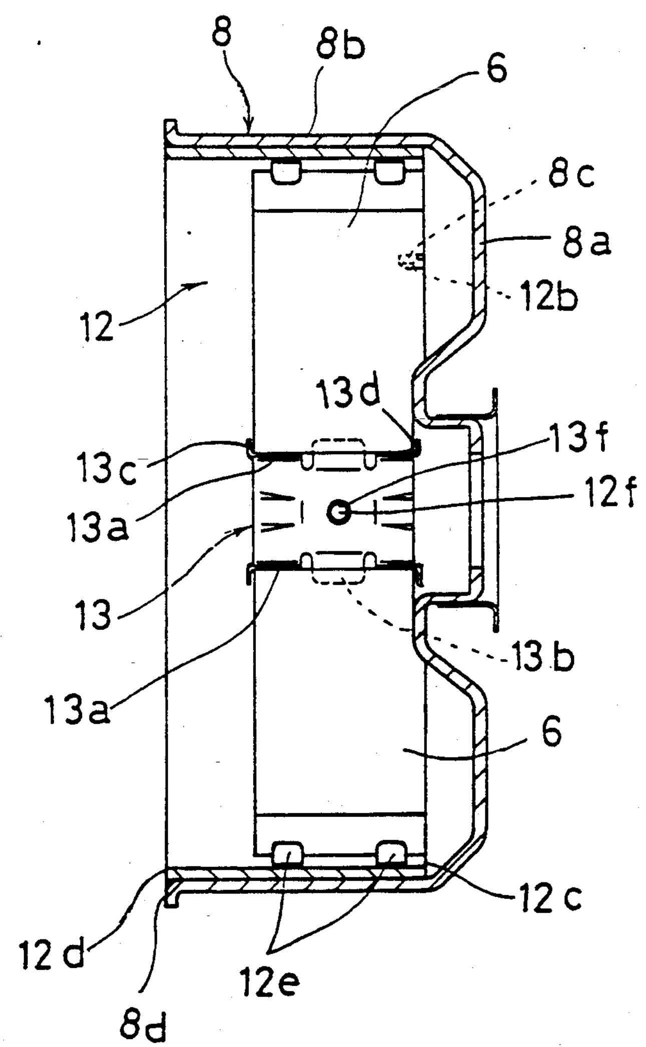
FIG. 4 is a sectional view taken along the line X—X shown/in FIG. 3.
Figure 5:
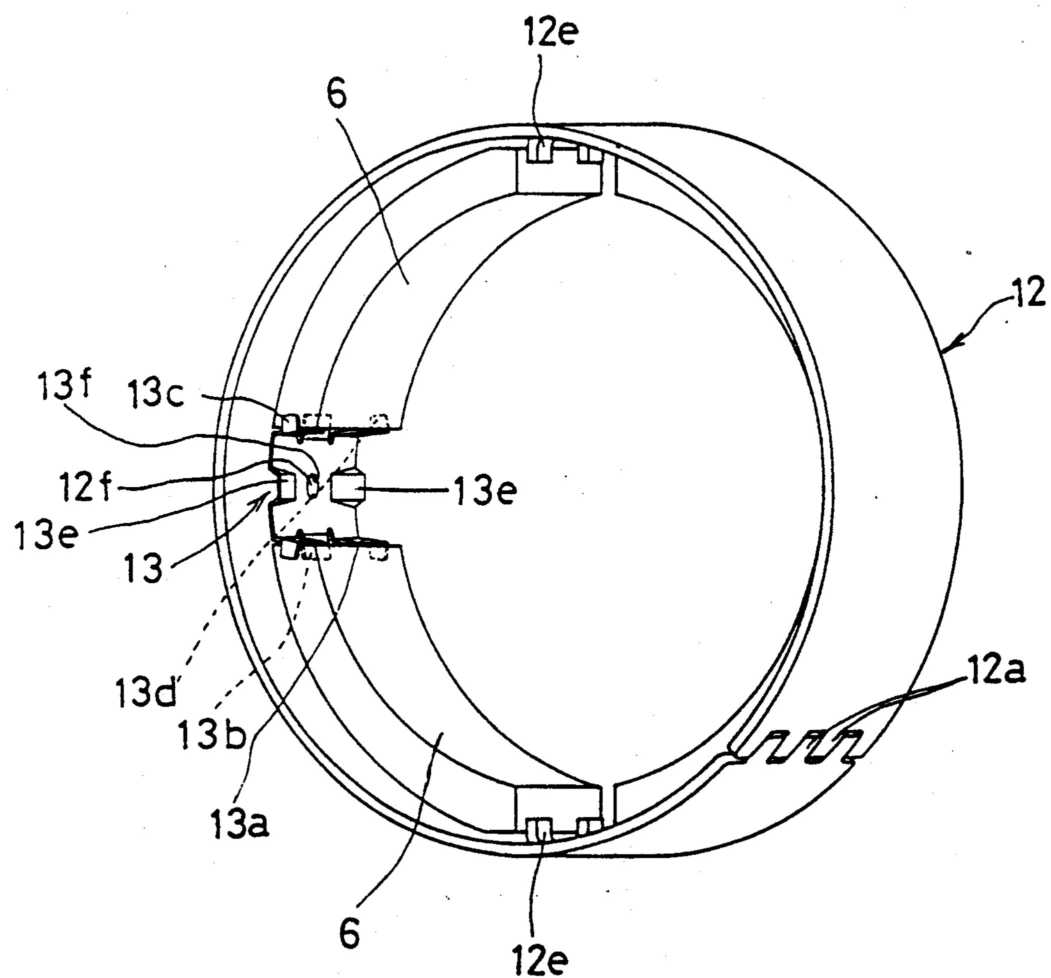
FIG. 5 is a perspective view of the inner cylinder carrying the permanent magnet fixed thereto.

An embodiment of the invention will now be described with reference to the drawings. Referring to the drawings, a motor 1, embodying the present invention, is a motor for a fan, and includes a casing A (described later), a motor shaft 2, a rotor core 3, a commutator 4, a brush 5, and a plurality of (four, in this embodiment) magnet elements together constituting a permanent magnet 6. The motor 1 is used in the fan through an arrangement which is similar to that in conventional practice, and which includes a fan boss 7 integrally mounted on one end of the motor shaft 2 projecting from the casing A, the fan boss 7 having a plurality of vanes **7*a*** formed thereon.

The casing A consists of a bottomed outer cylinder 8 having a bottomed end and an open end, and an end bracket 9 closing the open end of the outer cylinder 8, these members of the casing A being assembled together by integrally attaching the end bracket 9 to the outer cylinder 8. Each of the outer cylinder 8 and the end bracket 9 is made of aluminum, a non-magnetic substance. First and second end portions of the motor shaft 2 are rotatably supported by a bottom portion **8*a* of the outerg cylinder 8 and the end bracket 9 through bearings 11 and 11*a***, respectively.

An inner cylinder 12 is composed of a plate curved into a cylindrical shape in such a manner that the inner cylinder 12 is capable of elastically increasing or decreasing its diameter. The inner cylinder 12 is made of iron, a ferromagnetic substance. The plate has edge portions **12*a* at either end thereof, and each of these edge portions 12*a* is notched to form a series of alternating recesses and projections therein, the series on one end being out of phase with that on the other. When the plate is curved to constitute the inner cylinder 12, the edge portions 12*a* mesh with each other in the same manner as two racks mesh with each other. By virtue of this arrangement, when the diameter of the inner cylinder 12 increases or decreases, the edge portions 12*a* change, while meshing with each other, the depth of their meshing engagement by sliding away from and toward each other. The inner cylinder 12 has an outer diameter which, in the normal state of the inner and outer cylinders 12 and 8, is substantially the same as or slightly smaller than the inner diameter of the hollow cylindrical portion 8*b* of the outer cylinder 8. The above inner cylinder 12 is fitted into the cylindrical portion 8*b* of the outer cylinder 8**.

A position determining slit **12*b* is formed through a portion of the inner cylinder 12, while a position determining protrusion 8*c*, engageable with the slit 12*b*, is formed on a portion of the inner peripheral surface of the cylindrical portion 8*b*, thereby serving to determine the position of the inner cylinder 12 relative to the outer cylinder 8 in the circumferential direction. Further, the position of the inner cylinder 12 relative to the outer cylinder 8 in the axial direction is determined when the inner cylinder 12 is being fitted into the cylindrical portion 8*b*. More specifically, the fitting is performed in such a manner that the forward edge 12*c* (the edge inserted first) of the inner cylinder 12 abuts on the corner portion between the bottom portion 8*a* and the cylinrical portion 8*b*, and the rearward edge 12*d* is flush with an edge 8*d* at the open end of the outer cylinder 8**.

In this embodiment, the outer diameter of the inner cylinder 12 is set in such a manner that, when the cylinders 12 and 8 are in their normal state, the outer diameter is substantially the same as or slightly smaller than the inner diameter of the cylindrical portion 8*b*, thereby facilitating the fitting of the inner cylinder 12 into the cylindrical portion 8*b*. However, the present invention is not intended to be limited thereto, and the outer diameter of the inner cylinder 12 may be greater than the inner diameter of the cylindrical portion 8*b* in the normal state of the cylinders 12 and 8. In this case, the inner cylinder 12 is inserted into the cylindrical portion 8*b* while in a condition of being forcibly contracted in diameter. Thereafter, an elastic resilience which the inner cylinder 12 exhibits when release from the contracted condition, is utilized so that the inner cylinder 12 is integrally fitted on the inner peripheral surface of the cylindrical portion 8*b* while being prevented from disengaging from the inner peripheral surface and is also prevented from rotation relative to the cylindrical portion 8*b*. Further, the inner cylinder may be prepared from the beginning as a hollow cylindrical member, which is forcibly press-fitted into the cylindrical portion 8*b* of the outer cylinder 8.

A pair of magnet holders 13 are provided to fix the permanent magnet 6 to the inner peripheral surface of the inner cylinder 12. Each magnet holder 13 comprises a pair of magnet-pressing members 13*a* (each being formed by a process including cutting and raising). The magnet holders 13 are provided at diametrically opposite positions on the circumference of the inner peripheral surface of inner cylinder 12. Additionally, the inner cylinder 12 has a pair of magnet-supporting pieces 12*e* which are formed at positions substantially 180° apart from each other by subjecting portions of the inner cylinder 112 at these positions to a process including cutting and raising.

The magnet 6 is fixed in place in the following manner. First, the magnet-pressing members 13*a* of a magnet holder 13 are elastically deformed by pressing them inwardly from both sides so that the members 13*a* are brought close to each other. While the members 13*a* are in their pressed position, the magnet holder 13 is combined with two magnet elements of magnet 6 by placing the magnet elements of magnet 6 to the outward side of each magnet-pressing member 13*a*. The other magnet holder 13 is similarly deformed and combined with the remaining two magnet elements of magnets. These combinations, in each of which the magnet-pressing members 13*a* is pressed inwardly with the magnet elements mounted thereto, are inserted into position within the inner cylinder 12. Thereafter, when the inward pressure is released from the magnet-pressing members 13*a*, the magnet-pressing members 13*a* attempt to recover their normal position by virtue of their elastic resilience. The elastic resilience causes the magnet elements to be pressed toward the tangential magnet-supporting pieces 12*e* in the inner cylinder. In this way, the magnet elements of magnet 6 can be integrally fixed to the inner peripheral surface of the inner cylinder 12 with the magnet-supporting pieces 12*e* determining the position of the magnet 6 and preventing the magnet 6 from relative rotation. The fixing employs no adhesive. In addition, the elastic resilience of the magnet holder 13 acts on the inner cylinder 12, fitted in the cylindrical portion 8*b*, in a direction in which the inner cylinder 12 increases its diameter, thereby enabling the inner cylinder 12 to elastically increase or decrease its inner diameter in accordance with changes in the inner diameter of the cylindrical portion 8*b* of the outer cylinder 8.

Each of the magnet holders 13 has the following pieces formed therein: a disengagement preventing piece 13*b* for preventing the magnet holder 13 from radially inwardly displacing relative to the mated magnet elements and from disengaging therefrom; and movement preventing pieces 13*c* and 13*d*, formed as part of the magnet-pressing members 13*a*, for preventing the mated magnet elements from moving axially relative to the magnet-pressing member 13*a*. Further, in this embodiment, the mutually-meshing edge portions 12*a* of the inner cylinder 12 are positioned coinciding with a substantially circumferentially intermediate position of one of the magnet elements. Each magnet holder 13 is also formed with a pair of guide groove pieces 13*e*, and a position determining bore 13*f* engageable with a position determining bump 13*f* formed on the inner peripheral surface of the inner cylinder 12. When the magnetic holder 13 is being assembled onto the inner cylinder 12, each magnet-pressing member 13*a* is pushed inward in such a manner that the guide groove piece 13*e* guides the bump 12*f* until it engages with the position determining bore 13*f*. In this way, the magnetic holder 13 is assembled onto the inner cylinder 12 with its position determined.

In the embodiment of the invention having the above-described construction, the casing A of the motor 1 consists of the bottomed outer cylinder 8 and the end bracket 9 closing the open end of the outer cylinder 8, these members 8 and 9 being assembled to one another. Each of the outer cylinder 8 and the end bracket 9 is made of aluminum, a non-magnetic substance. On the other hand, the inner cylinder 12, to the inner periphery of which the permanent magnet 6 is fixed, is fitted in the cylindrical portion 8*b* of the outer cylinder 8. The inner cylinder 12 is made of iron, a ferromagnetic substance. As a result, while it is possible to assure that a magnetic circuit is formed in cooperation with the permanent magnet 6 by the iron inner cylinder 12, it is simultaneously possible to greatly reduce the weight of the entire motor by virtue of the fact that only the inner cylinder 12 is made using iron having a relatively great specific gravity and that the casing A is made of aluminum having a relatively small specific gravity. Furthermore, aluminum has a greater heat dissipating ability than iron, thereby making it possible to greatly suppress increases in the temperature of the motor 1 when the motor 1 is being driven or when it is used in a high-temperature atmosphere. The above features contribute greatly to the achievement of reductions in the weight of motors and to the suppression of increases in motor temperature.

Further, in this embodiment, since the motor 1 is used as a fan motor, it is possible for the aluminum casing A per se to be effectively cooled by a self-cooling current of air caused by the fan motor, thereby enabling a further suppression of increases in motor temperature. This is another advantage.

Further, while the inner cylinder 12 is composed of a plate curved into a cylindrical shape in such a manner that the inner cylinder 12 is able to elastically increase or decrease its diameter, the permanent magnet 6 is fixed to the inner peripheral surface of the inner cylinder 12 in such a manner that the magnet elements of the permanent magnet 6 are pressed toward the tangential magnet-supporting pieces 12*e* by the elastic resilience of the magnet-pressing members 13*a* of the magnet holder 13. Since the elastic resilience of the magnet holder 13 acts on the inner cylinder 12 fitted in the cylindrical portion 8*b* in the direction in which the diameter of the inner cylinder 12 increases, the inner cylinder 12 is tightly fitted on the inner peripheral surface of the cylindrical portion 8*b* while being pressed thereon. When the motor generates heat or when the motor is used in a high-temperature atmosphere, the difference in the materials of which the outer cylinder 8 and the inner cylinder 12 are made causes a difference in the thermal expansion of the outer and inner cylinders 8 and 12. At this time, however, the inner cylinder 12 elastically increases or decreases its diameter in accordance with changes in the inner diameter of the cylindrical portion 8*b*. Therefore, the cylinder 12 is always kept in the condition of being tightly fitted in the cylindrical portion 8*b* while closely contacting therewith. Thus, there is no risk of the difference in materials between the outer cylinder 8 and the inner cylinder 12 causing a problem.

Further, the edge portions 12*a* at either end of the plate constituting the inner cylinder 12 are notched and formed with a phase-different series of alternating recesses and projections. When the inner cylinder 12 increases or decreases its diameter, the edge portions 12*a*, meshing with each other, slide away from and toward each other to change the depth of their meshing engagement. This arrangement is advantageous in that, at this time, no linear gap occurs in the inner cylinder 12, thereby making it possible to assure that such an increase or decrease in diameter has only a very small influence on the function of the inner cylinder 12 to form a part of a magnetic circuit. When the inner cylinder 12 is composed of a curved plate, the pattern in which the edge portions abut on each other is not, of course, limited to that of the above-described embodiment where the edge portions formed with the phase-different series of recesses and projections abut on each other while meshing with each other. There are various possible patterns of abutment. For instance, the edge portions may abut on each other in an inclined pattern or a straight-line pattern.

In brief, with the above-described construction of the invention, a casing of a motor consists of a bottomed outer cylinder and an end bracket closing the open end of the outer cylinder, which members of the casing are assembled together into an integral unit. Each of the outer cylinder and the end bracket is made of a non-magnetic substance such as aluminum. On the other hand, an inner cylinder, to the inner peripheral surface of which is fixed a permanent magnet, is integrally fitted into a cylindrical portion of the outer cylinder. The inner cylinder is made of a ferromagnetic substance such as iron. As a result, while the inner cylinder made of a ferromagnetic substance enables the formation of a magnetic circuit in cooperation with a permanent magnet, the fact that a ferromagnetic substance, such as iron having a relatively great specific gravity, is used only in the inner cylinder and that a non-magnetic substance, such as aluminum having a relatively small specific gravity, is used to form the casing enables a great reduction in the weight of the entire motor, thereby enabling the achievement of reductions in the weight of motors, such reductions being demanded today.

Further, when aluminum is used as the non-magnetic substance, the use of aluminum, a substance having an excellent heat dissipating ability, is advantageous in that it is possible to greatly suppress increases in the temperature of the motor when the motor is being driven or when it is used in a high-temperature atmosphere.

Further, when the inner cylinder is composed of a plate curved into a cylindrical shape in such a manner that the inner cylinder is able to elastically increase and decrease its diameter, the inner cylinder is able to elastically increase or decrease its diameter in accordance with changes in the inner diameter of the cylindrical portion of the outer cylinder. When the motor generates heat or when the motor is used in a high-temperature atmosphere, the difference in materials between the outer cylinder and the inner cylinder results in a difference in thermal expansion between the outer and inner cylinders. However, since the inner cylinder is, in such cases, able to elastically change (increase or decrease) its diameter in accordance with changes in the inner diameter of the cylindrical portion, the inner cylinder is always kept in a condition of being tightly fitted in the cylindrical portion while closely contacting therewith. Thus, the above ability of the inner cylinder eliminates the risk of the difference in materials between the outer and the inner cylinders causing a problem.

What is claimed is:

1. A casing structure for a motor having a permanent magnet provided on a cylindrical inner peripheral surface of a casing, said casing structure comprising:

a casing consisting of a bottomed outer cylinder having a cylindrical portion, and an end bracket closing an open end of said outer cylinder, each of said outer cylinder and said end bracket being made of a non-magnetic substance; and an inner cylinder integrally fitted on an inner peripheral surface of said cylindrical portion of said outer cylinder and made of a ferromagnetic substance, said inner cylinder being composed of a plate curved into a cylindrical shape in such a manner that said inner cylinder is capable of elastically increasing or decreasing its diameter, and said inner cylinder carrying a permanent magnet fixed to the inner peripheral surface thereof.

2. A casing structure for a motor according to claim 1, wherein said non-magnetic substance is aluminum and said ferromagnetic substance is iron.

3. A casing structure for a motor, comprising:

a casing body having an outer cylindrical wall and a first end closing portion;

an end bracket for enclosing a second end of said casing body;

an inner cylinder mounted within an inner peripheral surface of said outer cylindrical wall, said inner cylinder being a plate curved into a cylindrical shape such that a diameter of said inner cylinder may expand and contract; and a magnet mounted on an inner surface of said inner cylinder.

4. The casing structure as claimed in claim 3, wherein ends of said curved plate comprising said inner cylinder are adjacent one another.

5. The casing structure as claimed in claim 4, wherein said ends have irregular edges to provide overlap to one another.

6. The casing structure as claimed in claim 3, wherein said magnet comprises a plurality of magnet elements.

7. The casing structure as claimed in claim 6, further comprising at least two magnet holders, wherein said inner cylinder has a plurality of magnet-supporting pieces projecting inwardly at predetermined positions such that each one of the magnet elements may be mounted between a one of said at least two magnet holders and a pair of said plurality of magnet-supporting pieces.

8. The casing structure as claimed in claim 7, wherein the magnet holders have a U-shaped cross section with a base and two magnet-pressing members extending therefrom.

9. The casing structure as claimed in claim 8, wherein each magnet-pressing member further co movement preventing means for preventing the mounted magnetic elements from moving axially relative to the magnet-pressing member.

10. The casing structure as claimed in claim 8, wherein the base for the magnet holder further comprises:

at least one disengagement preventing piece for preventing the magnet holder from radially inwardly deplacing relative to the magnet element and disengaging therefrom; and a position determining bore.

11. The casing structure as claimed in claim 10, wherein the inner cylinder has at least two position determining bumps, one position determining bump for mating with the position determining bore of each one of the magnet holders.

12. The casing structure as claimed in claim 3, wherein the casing body and the end bracket are made of a non-magnetic substance and the inner cylinder is made of a ferromagnetic substance.

13. The casing structure as claimed in claim 12, wherein said non-magnetic substance is aluminum and said ferromagnetic substance is iron.

* * * * *